(12) United States Patent
Varshney et al.

(10) Patent No.: US 6,915,016 B2
(45) Date of Patent: Jul. 5, 2005

(54) METHOD AND APPARATUS FOR WIRELESS IMAGE TRANSMISSION

(75) Inventors: Pramod Varshney, Fayetteville, NY (US); Liane Ramac-Thomas, Ellicott City, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 610 days.

(21) Appl. No.: 10/142,141

(22) Filed: May 9, 2002

(65) Prior Publication Data

US 2002/0191700 A1 Dec. 19, 2002

Related U.S. Application Data

(60) Provisional application No. 60/297,707, filed on Jun. 12, 2001.

(51) Int. Cl.[7] ................................................ G06K 9/46
(52) U.S. Cl. ........................ 382/240; 370/389; 348/234
(58) Field of Search ........................ 382/240; 370/389; 348/234; 375/240.18, 240.19; 715/719

(56) References Cited

U.S. PATENT DOCUMENTS

| | | | | |
|---|---|---|---|---|
| 6,166,729 A | * | 12/2000 | Acosta et al. | 715/719 |
| 6,526,175 B2 | * | 2/2003 | Sodagar et al. | 382/240 |
| 6,825,876 B1 | * | 11/2004 | Easwar et al. | 348/234 |

OTHER PUBLICATIONS

Kim et al., "A MS–GS VQ Codebook Design for Wireless Image Communication Using Genetic Algorithms", IEEE, Transactions on Evolutionary Computation, vol. 3, No. 1, Apr. 1999, pps. 35–52.*

* cited by examiner

*Primary Examiner*—Anh Hong Do
(74) *Attorney, Agent, or Firm*—Joseph A. Mancini

(57) ABSTRACT

An image, whether compressed or uncompressed, can be transmitted via a fading communication channel to provide at the receiver an image of good perceptual quality despite the impaired channel. Diversity improves wireless transmission by using highly uncorrelated signal paths to combat channel noise. The apparatus and method of the present invention operates in the wavelet domain by using the properties of the original image or its wavelet transform. For an uncompressed image, one computes the two-dimensional wavelet transform of the source image and scalar quantizes the resulting wavelet coefficients. These coefficients are transmitted as a wireless bit stream with diversity to obtain multiple copies of the decomposed image data. At the receiver, the coefficients of the individual decomposed images are combined to form a composite wavelet transform. The final received image is reconstructed from the composite transform. A compressed image is first error protected and then transmitted by wireless using diversity. Multiple bit streams representing the image are decoded with appropriate channel decoding algorithms followed by image decompression up to the point where the wavelet representations of the multiple images are obtained. Before computing the inverse wavelet transform, the individual wavelet representations are combined using rules based on wavelet transform characteristics. After diversity combining, a composite wavelet representation is obtained, and the received image is reconstructed by performing the inverse wavelet transform on this composite representation.

8 Claims, 4 Drawing Sheets

METHOD AND APPARATUS FOR WIRELESS IMAGE TRANSMISSION

PRIORITY CLAIM UNDER 35 U.S.C. §119(e)

This patent application claims the priority benefit of the filing date of a provisional application, Ser. No. 60/297,707, filed in the United States Patent and Trademark Office on Jun. 12, 2001.

STATEMENT OF GOVERNMENT INTEREST

The invention described herein may be manufactured and used by or for the Government for governmental purposes without the payment of any royalty thereon.

BACKGROUND OF THE INVENTION

This invention relates to transmitting an image via a fading communication channel to provide at the receiver an image of good perceptual quality despite the impaired channel. This invention relates further to transmitting both uncompressed and compressed images under like circumstances.

Techniques have been proposed for transmitting images over wireless channels by compressing images with the discrete cosine transform (DCT) or the wavelet transform. These techniques can be divided into four categories: (1) detecting and correcting errors, (2) coding images to be error-resilient, (3) concealing errors, and (4) hybrid techniques. Category 1 techniques combat the errors introduced during wireless transmission through automatic repeat requests (ARQs) or through error coding. Category 2 techniques make the transmitted data stream less sensitive to wireless channel errors. Thus, when the data arrives at the receiver, it can be recovered from errors in the bit stream. Category 3 techniques attempt to hide errors that degrade the perceptual quality of the image after it has been received. Category 4 techniques combine the techniques of categories 1–3.

Diversity is a communication technique that improves wireless transmission by using highly uncorrelated signal paths to combat channel noise. Diversity techniques include spatial-, frequency-, and time-diversity. In all of these, multiple uncorrelated signals are combined at the receiver to generate the information. Selection diversity is one simple example of diversity combining that takes the signal from the diversity branch with the highest SNR. Other common techniques for diversity combining are equal-gain and maximal-ratio. All of these techniques carry out diversity combining in the data domain; they attempt to obtain the best estimate of the received digital data.

OBJECTS AND SUMMARY OF THE INVENTION

An object of the present invention is to provide wireless image transmission that improves image quality by combating the effects of fading and other channel impairments.

A further object of the present invention is to provide wireless image transmission that combats the effects of fading and other channel impairments by operating in the wavelet domain using the properties of the original image or its wavelet transform.

Still a further object of the present invention is to provide wireless image transmission that makes use of a diversity combining technique.

The diversity combining technique of the present invention operates in the wavelet domain by using the properties of the original image or its wavelet transform. This approach to wireless image transmission combats the effects of fading and other channel impairments by employing a diversity combining method that directly improves image quality.

Briefly stated, the present invention provides that an image, whether compressed or uncompressed, can be transmitted via a fading communication channel to provide at the receiver an image of good perceptual quality despite the impaired channel. Diversity improves wireless transmission by using highly uncorrelated signal paths to combat channel noise. The apparatus and method of the present invention operates in the wavelet domain by using the properties of the original image or its wavelet transform. For an uncompressed image, one computes the two-dimensional wavelet transform of the source image and scalar quantizes the resulting wavelet coefficients. These coefficients are transmitted as a wireless bit stream. Multiple copies of the decomposed image data are obtained at the receiver due to diversity method being employed. Several diversity methods including frequency diversity, space diversity and time diversity are potential candidates for embodiment. Space diversity may be preferred because it conserves channel bandwidth and channel usage. At the receiver, the coefficients of the individual decomposed images are combined to form a composite wavelet transform. The final received image is reconstructed from the composite transform. A compressed image is first error protected and then transmitted over a wireless channel. Multiple diversity bit streams obtained at the receiver representing the image are decoded with appropriate channel decoding algorithms followed by image decompression up to the point where the wavelet representations of the multiple images are obtained. Before computing the inverse wavelet transform, the individual wavelet representations are combined using rules based on wavelet transform characteristics. After diversity combining, a composite wavelet representation is obtained, and the received image is reconstructed by performing the inverse wavelet transform on this composite representation.

According to an embodiment of the invention, the wavelet domain diversity combining method is able to combat wireless channel impairments effectively and yields images of good perceptual quality for both uncompressed and compressed images.

According to a feature of the invention, the diversity method operates in the wavelet domain instead of in the conventional data domain. The properties of the original image and its wavelet transform allow reception of images of superior quality.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Uncompressed Image Data

Figure 1:
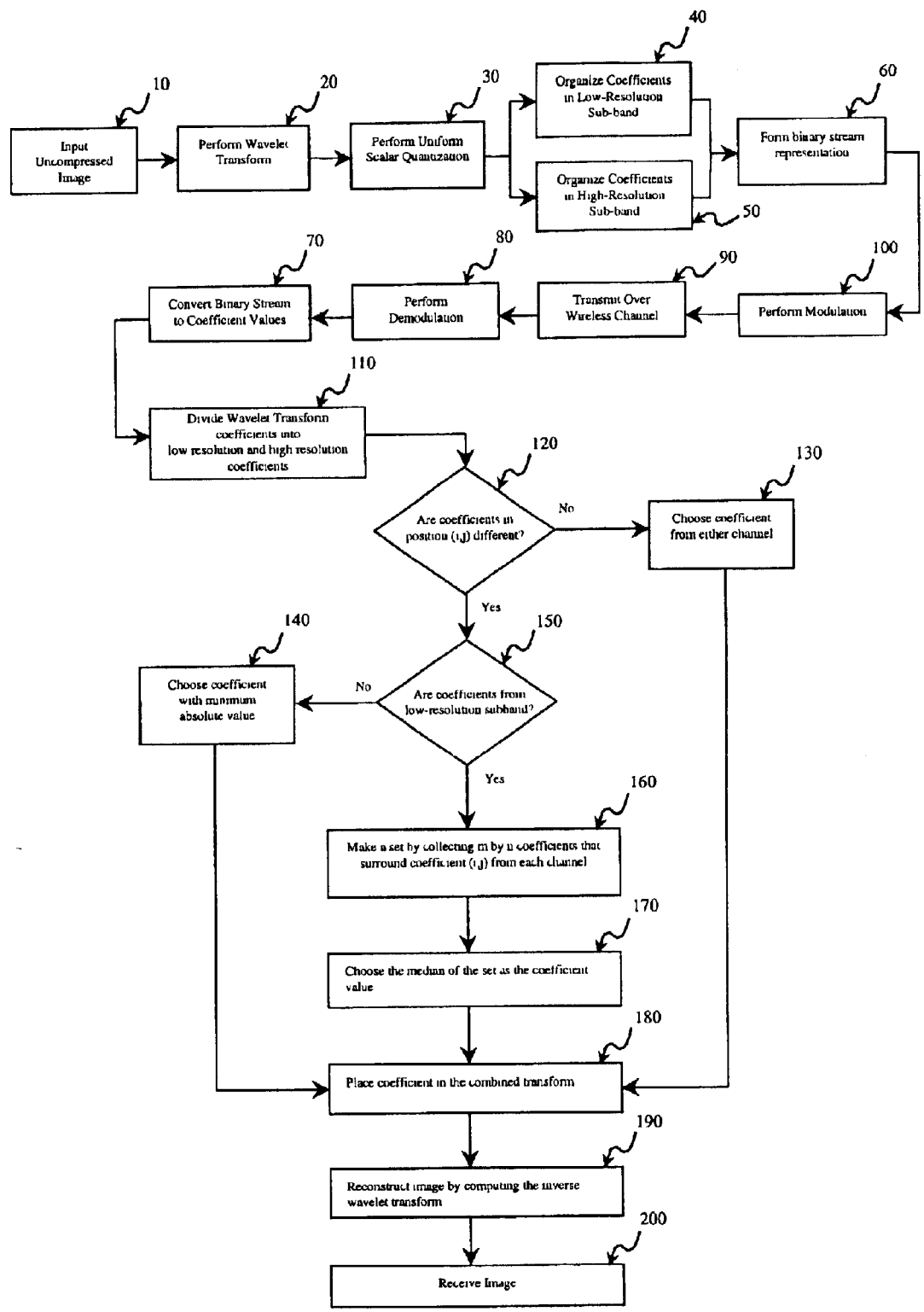
FIG. 1 is a flow diagram illustrating the detailed operation of the image transmission method for uncompressed image data.

Referring to FIG. 1, the technique of the present invention for uncompressed images requires inputting images 10, computing the two-dimensional wavelet transform 20, of the images, and scalar quantizing 30 the wavelet coefficients that result from the transform. The wavelet coefficients are then organized in terms of low 40 and high 50 resolution sub-bands, converted to their binary representation 60, modulated 100, and transmitted 90 as a bit stream over a wireless communications system without any error control. Due to the diversity method being employed, one obtains multiple copies of the wavelet transform of the image data at the receiver where they are demodulated 80 and where the demodulated binary stream is converted to individual wavelet transform coefficients 70, divided into low and high resolution coefficient values 110 and combined using the Wavelet Domain Diversity Combining method 120, 130, 140, 150, 160, 170 to form the combined wavelet transform 180. An inverse wavelet transform is computed to reconstruct the image 190 and the image is received 200.

The two-dimensional wavelet transform 20 of an image is implemented with traditional sub-band filtering using one-dimensional low- and high-pass quadrature mirror filters. The transmitted image is first decomposed using the two-dimensional wavelet transform 20. This decomposition is followed by uniform scalar quantization 30 of the wavelet coefficients. The coefficients are then ordered into low 40 and high 50 sub-bands and converted to a binary stream 60 with a specified number of bits representing each coefficient. The binary stream is then modulated 100 and transmitted 90 over a wireless channel. At the receiver, the binary stream is received on individual diversity channels, demodulated 80, and converted to coefficient values 70. The wavelet transform coefficients are divided into two groups 110: (1) low-resolution coefficients and (2) high resolution coefficients. In general, the low-resolution sub-band coefficients are more important perceptually. Errors in the high-frequency sub-bands are not as important to the overall image quality. Because the characteristics of the sub-bands are different, the diversity-combining rule for the low-resolution sub-band differs from the combination rule for the high-resolution sub-bands (see FIG. 2). The following discussion assumes two diversity channels. Obviously more than two diversity channels can be used in a similar manner.

The low-frequency sub-band and high frequency sub-bands have different sensitivities to bursty channel errors. Therefore the application of rules 210 (see FIG. 2) for the two types of sub-bands are different. For both subband types there are two combination modes: selection and combining of coefficients. In the selection of coefficients 130, 140 one wavelet transform coefficient is selected from the wavelet transform coefficients of the two received images and placed in the wavelet transform of the composite image. In the combining of coefficients 160, 170, 180 groups of coefficients from neighborhoods of both decomposed images are examined, and a value is chosen for the composite decomposed image based on measures from both coefficient neighborhoods. Combining is similar to using both image averaging and spatial filtering to remove channel noise.

For the low-resolution sub-band, the coefficients from the two diversity bit streams are compared as they arrive at the receiver 120. If the received wavelet coefficients have the same value, we assume that the value is correct and select the coefficient from either channel 130 to place in the combined wavelet transform 180. If the coefficient values differ 120, the receiver waits until a neighborhood of coefficients surrounding the coefficient of interest is available from both channels 160. Small neighborhoods (e.g., 3 by 3 pixels) of an image are generally smooth, and the intensity usually does not vary significantly within a neighborhood. When the two corresponding coefficients at a location are different, the neighborhoods of coefficients around them are grouped into a set 160. Then the median value of this set of coefficients is chosen 170 for the combined low-resolution sub-image at the same location. This median-based technique tends to be more robust to large channel errors than averaging the coefficients to obtain a combined value.

An error in the high frequency sub-bands does not affect the quality of the final reconstructed image as much as an error in the low frequency sub-bands. Also, most of the coefficients have values close to zero. Therefore the errors in the detail sub-bands are processed differently when the received wavelet coefficients are not the same. If the received values are the same 120, we assume that the value is correct and place it in the combined transform 180. However, if the received values are different 120, the coefficient with the minimum absolute value is chosen 140 for placement into the combined wavelet transform 180. This choice responds to the fact that a coefficient that implies a strong edge where one does not exist will visually degrade the image more than a coefficient that implies no edge where one really exists. Since most of the coefficients in the high-frequency sub-bands are near zero, there is a better chance that the coefficient with the minimum absolute value will be correct. Even if we set the coefficients to zero in the high-frequency sub-bands, the quality of the final image will still be acceptable.

After one obtains the composite wavelet transform coefficients by combining the individual wavelet transform coefficients 180, one obtains the final image by computing the inverse wavelet transform 190 of the composite wavelet transform and receiving 200 the image.

Figure 2:
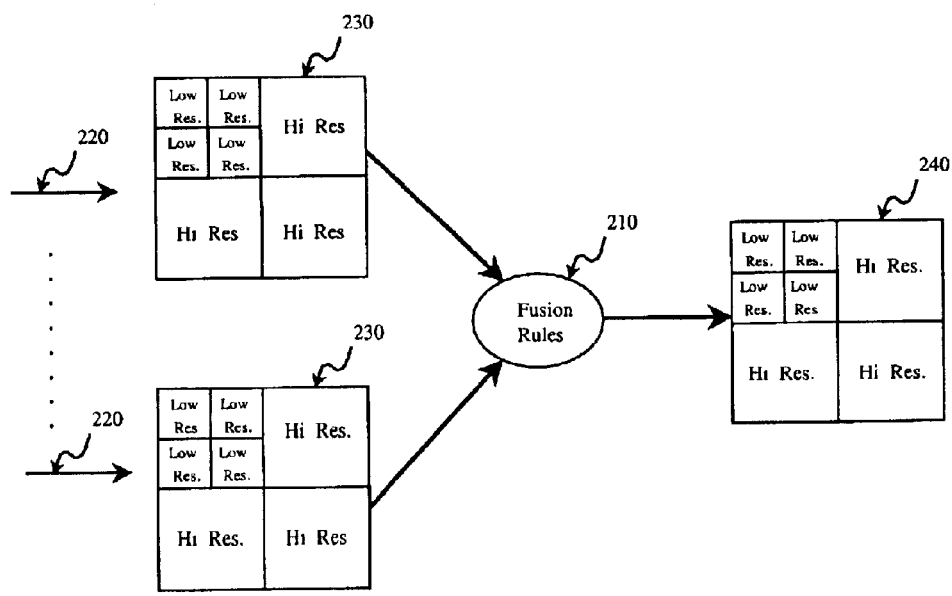
FIG. 2 is a diagram of the wavelet domain diversity combining process at the receiver for uncompressed image data.
Figure 2:
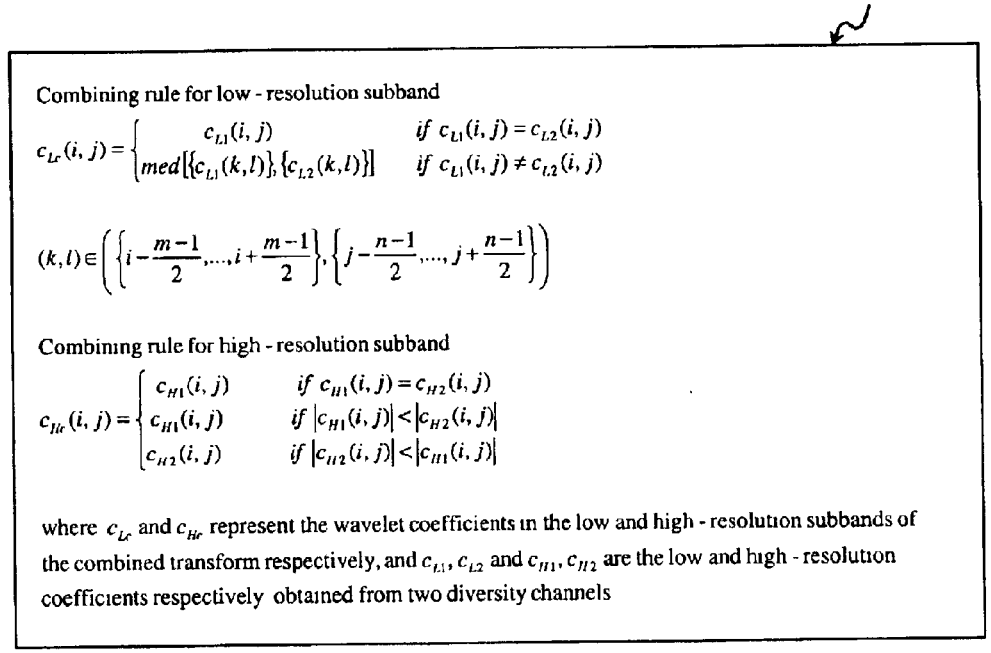

Referring to FIG. 2, the wavelet coefficient combining process according to fusion rules is graphically depicted. A binary stream of wavelet coefficient values enter through diversity channels 220. For each diversity channel 220, a wavelet transform of the image 230 is composed of low resolution and high resolution sub-band coefficients as the result of the aforementioned step of dividing 110 (see FIG. 1). Fusion rules are applied 210 to the wavelet transforms to produce a combined wavelet transform of the image 240.

Compressed Image Data

Figure 3:
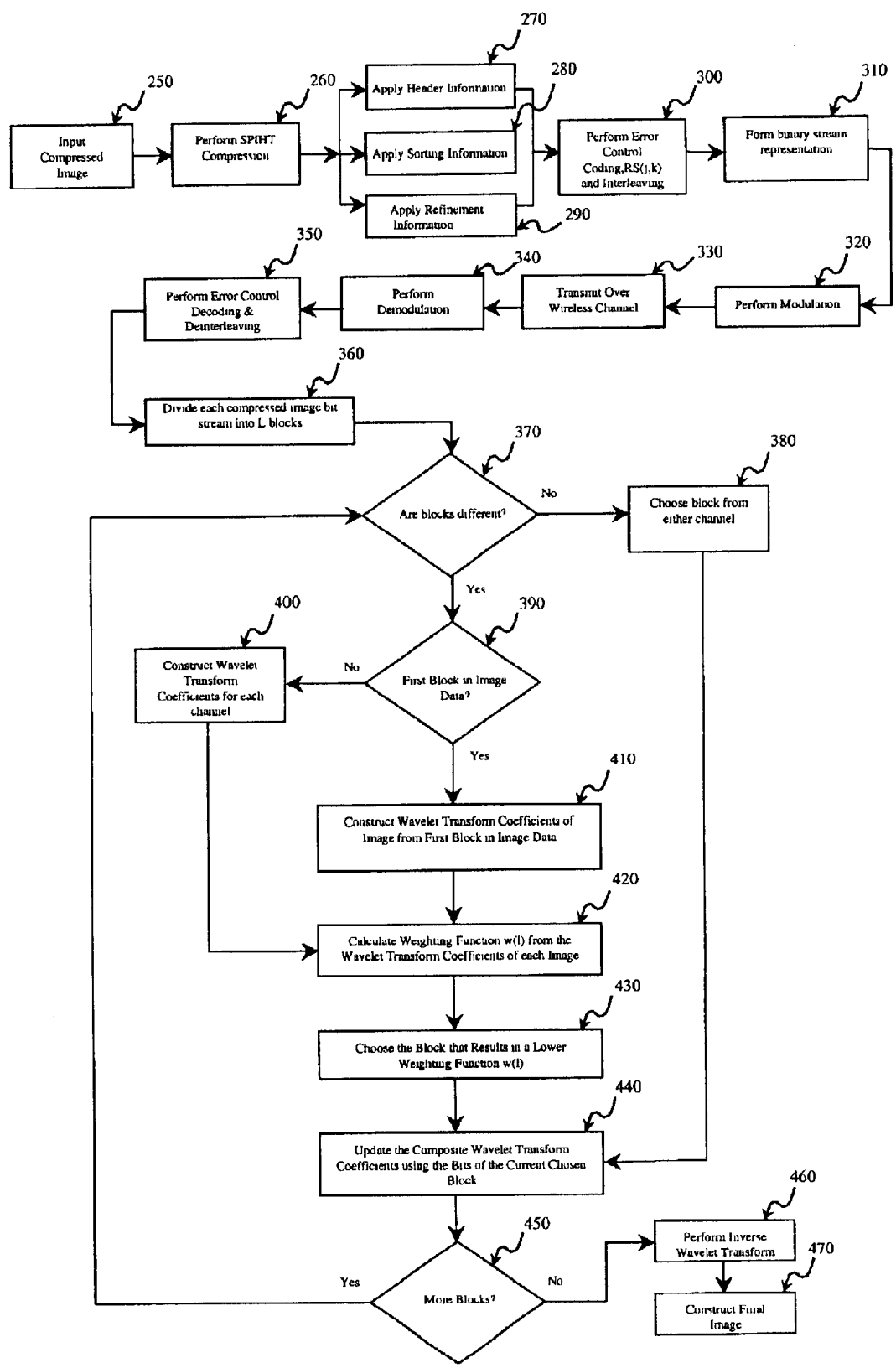
FIG. 3 is a flow diagram illustrating the detailed operation of the image transmission method for compressed image data.

Referring to FIG. 3, the technique of the present invention for compressed images requires inputting a compressed image 250 and compressing the image data using the SPIHT algorithm 260 (see A. Said and W. A. Pearlman, "A new, fast, and efficient image codec based on set partitioning in hierarchical trees, *IEEE Transactions on Circuits and Systems for Video Technology*, pp. 243–250 (June 1996)). Header information 270, sorting information 280, and refinement information 290 are first applied to the compressed image data before it is protected with interleaving and error control coding 300. The image data is then placed into a binary stream representation 310, modulated 320, and then transmitted over a wireless communications system 330 using diversity. Multiple bit streams representing the image data arrive at the receiver where they are demodulated 340. After the bit streams are deinterleaved and decoded 350 each stream that represents the compressed image is divided into L blocks of $N_i$ bits each, where i=1,2, . . . , L 360. Every block in a channel should have the same number of bits as its corresponding block in the other channel. For example, the fifth block in channel one should have the same number of bits as the fifth block in channel two.

If the received bit streams corresponding to a block are the same 370, we assume that the bits are correct and select the block from either channel 380 for the combined transform 440. If the bit streams are different 370, the wavelet coefficients of the image are obtained by decompressing the SPIHT bits in the block for each channel 410. The block-based diversity rule applies a decision measure to each received block to construct or update wavelet transform coefficients. Based on the calculated decision measure one block is selected from the blocks available from the two channels 430. The bits from the selected block are used to update the composite wavelet transform coefficients of the image 440. (see FIG. 4 for two different decision measure rules to calculate the weighting function w(l)). The first rule, the counting measure, 540 (see FIG. 4) is based on the local smoothness of the low resolution sub-band and the zerotree (or spatial orientation tree) relationships of the detail sub-bands. The second rule, 550 (see FIG. 4) the weighted measure, is based on both local and global measures. The local measures are the local differences for the low-resolution sub-band and the zerotree relationships for the detail sub-bands. The global measures are the variance for the low-resolution sub-band and the individual coefficient values for the detail sub-bands. The decision measure depends on wavelet transform characteristics, as described above for uncompressed data. Since the SPIHT algorithm transmits bits in order of magnitude and not necessarily by sub-band, the decision measures w(l) are calculated from both low-resolution and detail sub-bands, (see FIG. 4).

Figure 4:
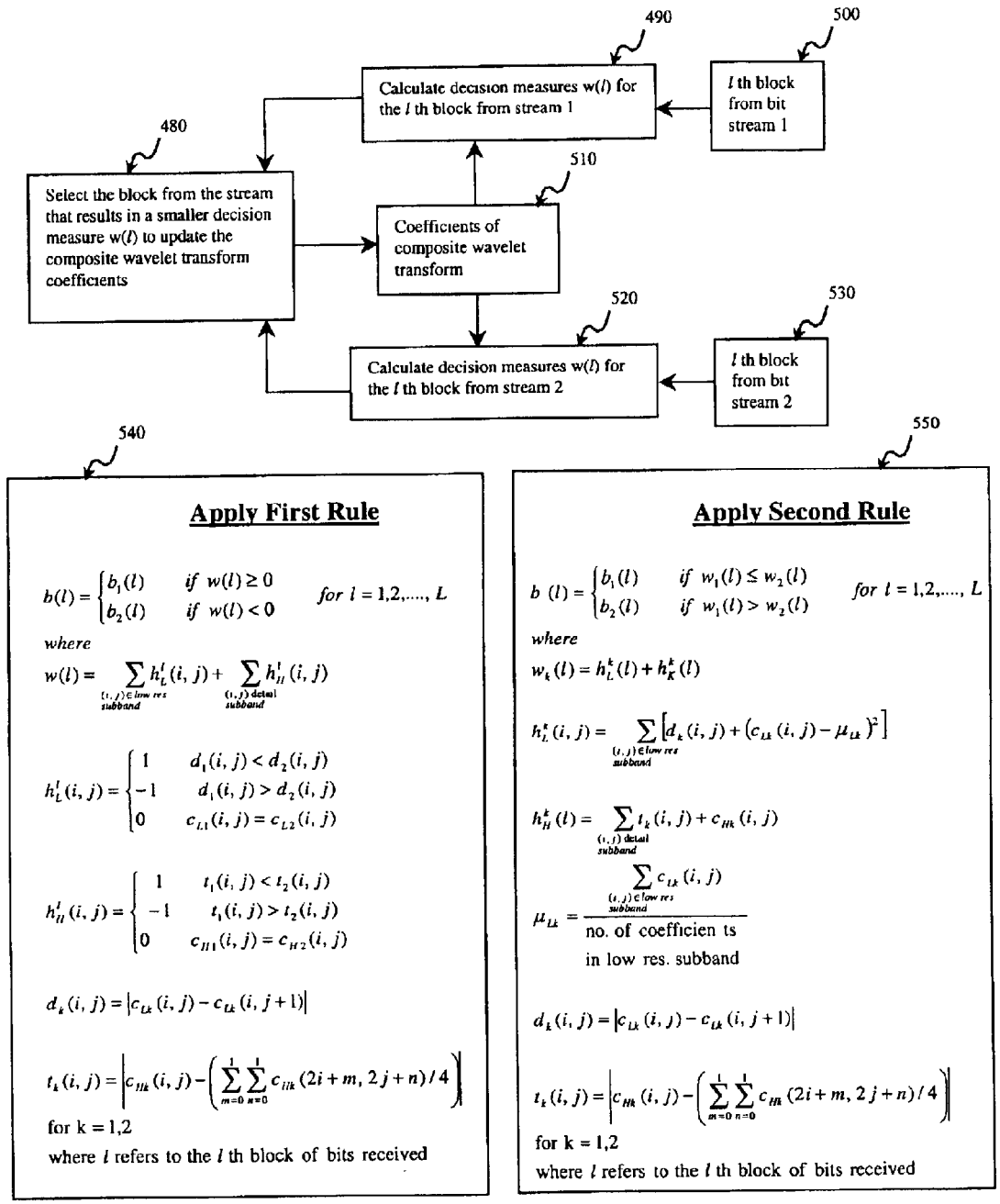
FIG. 4 is a diagram of the wavelet domain diversity combining process at the receiver for compressed image data.

Referring to FIG. 4, depicting the wavelet domain diversity combining process at the receiver for compressed image data where wavelet transform coefficients of individual images are reconstructed with blocks of bits, beginning with the first data block from each channel 480, 490, 500, 510, 520, 530 (see 410, FIG. 3). The decision measure function w(l) is calculated for every block from each channel 490, 520. The calculated decision measure functions w(l) are compared 480 for each channel and the block with the smaller decision measure is used to update the composite wavelet transform coefficients 510. For all following blocks of the two channels, the wavelet transform coefficients of the image are updated using the current block of that channel to obtain the current wavelet transform coefficients for the image of that channel 490, 520. The decision measure w(l) is calculated after receiving every block and updating the wavelet transform coefficients of each channel. The block from the channel that results in a smaller decision measure w(l) is selected 480. Composite wavelet transform coefficients are updated using the selected block 510. Once all the transmitted blocks for an image have been fused to obtain the composite image wavelet transform coefficients, the inverse wavelet transform is applied to construct the transmitted image 460 (see FIG. 3).

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for wireless image transmission, comprising the steps of:

inputting an image selected from the group consisting of uncompressed images and compressed images, whereupon if said image is UNCOMPRESSED, then said method for wireless image transmission further comprises the steps of:

performing a wavelet transform of said image to produce wavelet coefficients;

performing a scalar quantization of said wavelet coefficients;

organizing said coefficients into low-resolution sub-bands and high-resolution sub-bands;

forming said organized coefficients into a binary stream representation;

modulating said binary stream representation;

transmitting said modulated binary stream representation over a wireless channel;

demodulating said transmitted binary stream;

reconverting said demodulated binary stream back into reconverted wavelet coefficient values;

dividing said reconverted wavelet coefficient values into low resolution and high resolution coefficients;

performing a wavelet coefficient combining process, comprising:

a first step of determining whether said divided wavelet coefficient values in position (i,j) are different, whereas, if said divided wavelet coefficient values in position (i,j) are different, THEN said step of performing a wavelet coefficient combining process further comprises:

a second step of determining whether said divided wavelet coefficient values are from the low-resolution sub-band, whereas, if said divided wavelet coefficient values are from the low-resolution sub-band, THEN said step of performing a wavelet coefficient combining process further comprises:

making a set by collecting M by N said divided wavelet coefficient values that surround coefficient (i,j) from each channel;

choosing the median of said set as the new coefficient value;

placing said new coefficient value in a combined transform;

reconstructing said image by computing the inverse wavelet transform;

receiving said image;

OTHERWISE, if said divided wavelet coefficient values are NOT from the low-resolution sub-band, THEN said step of performing a wavelet coefficient combining process further comprises:

choosing said divided wavelet coefficient value with a minimum absolute value;

placing said coefficient value with a minimum absolute value in a combined transform;

reconstructing said image by computing the inverse wavelet transform;

receiving said image;

OTHERWISE, if said divided wavelet coefficient values in position (i,j) are NOT different, THEN said step of performing a wavelet coefficient combining process further comprises:

choosing said divided wavelet coefficient value from either channel;

placing said coefficient value from either channel in a combined transform;

reconstructing said image by computing the inverse wavelet transform; and receiving said image.

2. Method of claim 1, wherein said step of performing a wavelet coefficient combining process further comprises the step of applying a fusion rule, said fusion rule being:

Combining rule for low-resolution subband $$c_{Lc}(i,j) = \begin{cases} c_{L1}(i,j) & \text{if } c_{L1}(i,j) = c_{L2}(i,j) \\ \text{med}[\{c_{L1}(k,l)\},\{c_{L2}(k,l)\}] & \text{if } c_{L1}(i,j) \neq c_{L2}(i,j) \end{cases}$$

$$(k,l) \in \left(\left\{i - \frac{m-1}{2}, \ldots, i + \frac{m-1}{2}\right\}, \left\{j - \frac{n-1}{2}, \ldots, j + \frac{n-1}{2}\right\}\right)$$

Combining rule for high-resolution subband $$c_{Hc}(i,j) = \begin{cases} c_{H1}(i,j) & \text{if } c_{H1}(i,j) = c_{H2}(i,j) \\ c_{H1}(i,j) & \text{if } |c_{H1}(i,j)| < |c_{H2}(i,j)| \\ c_{H2}(i,j) & \text{if } |c_{H2}(i,j)| < |c_{H1}(i,j)| \end{cases}$$

where $c_{Lc}$ and $c_{Hc}$ represent the wavelet coefficients in the low and high-resolution subbands of the combined transform respectively, and $c_{L1}$, $c_{L2}$ and $c_{H1}$, $c_{H2}$ are the low and high-resolution coefficients respectively obtained from two diversity channels
said fusion rule being applied to the wavelet transform of said image produced from each diversity channel so as to produce a combined wavelet transform of said image.

3. The method for wireless image transmission as in claim 1 wherein said image is COMPRESSED, said method for wireless image transmission further comprising the steps of:
compressing said image using SPIHT algorithm;
applying header information, sorting information and refinement information to said compressed image;
performing error control coding and interleaving to said compressed image;
forming a binary stream representation of said coded and interleaved image;
modulating said binary stream representation;
transmitting said modulated binary stream representation over a wireless channel;
demodulating said transmitted binary stream;
performing error control decoding and deinterleaving on said demodulated binary stream;
dividing each said compressed image bit stream into L blocks of $N_1$ bits each where i=1,2,3, . . . L;
performing a wavelet coefficient combining process, comprising:
 a first step of determining whether said bit streams corresponding to said block are different, whereas if said bit streams corresponding to said block are different, THEN said step of performing a wavelet coefficient combining process further comprises:
 a second step of determining whether first said block in bit stream, whereas if first said block in bit stream, THEN said step of performing a wavelet coefficient combining process further comprises:
  constructing the wavelet transform coefficients from said first block;
  calculating the weighting function w(l) from said wavelet transform coefficients for each said image;
  choosing said block that results in lower said weighting function w(l);
  updating the composite wavelet transform coefficients using said bits of the current said chosen block;
 a third step of determining whether there are more blocks, whereas if there are more said blocks, THEN said step of performing a wavelet coefficient combining process further comprises:
  repeating said step of performing a wavelet coefficient combining process;
  OTHERWISE, performing a inverse wavelet transform;
  constructing final image;
 OTHERWISE, in not first said block in bit stream; THEN said step of performing a wavelet coefficient combining process further comprises:
  constructing wavelet transform coefficients for each diversity channel;
  resuming said step of performing a wavelet coefficient combining process at said step of calculating the weighting function w(l) from said wavelet transform coefficients for each said image;
OTHERWISE, if said bit streams corresponding to said block are NOT different, THEN said step of performing a wavelet coefficient combining process further comprises:
 choosing a block from either channel; and
 resuming said step of performing a wavelet coefficient combining process at said step of updating the composite wavelet transform coefficients using said bits of the current said chosen block.

4. Method of claim 3, wherein said step of performing a wavelet coefficient combining process further comprises the step of:
applying two decision measure rules for computing said weighting function w(l), said decision measure rules comprising a counting measure rule and a weighted measure rule, said counting measure rule being:

$$b(l) = \begin{cases} b_1(l) & \text{if } w(l) \geq 0 \\ b_2(l) & \text{if } w(l) < 0 \end{cases}$$

for $l = 1, 2, \ldots, L$ where $$w(l) = \sum_{(i,j) \in \text{low res. subband}} h_L^l(i,j) + \sum_{(i,j) \text{ detail subband}} h_H^l(i,j)$$

$$h_L^l(i,j) = \begin{cases} 1 & d_1(i,j) < d_2(i,j) \\ -1 & d_1(i,j) > d_2(i,j) \\ 0 & c_{L1}(i,j) = c_{L2}(i,j) \end{cases}$$

$$h_H^l(i,j) = \begin{cases} 1 & t_1(i,j) < t_2(i,j) \\ -1 & t_1(i,j) > t_2(i,j) \\ 0 & c_{H1}(i,j) = c_{H2}(i,j) \end{cases}$$

$$d_k(i,j) = |c_{Lk}(i,j) - c_{Lk}(i,j+1)|$$

$$t_k(i,j) = \left| c_{Hk}(i,j) - \left(\sum_{m=0}^{1}\sum_{n=0}^{1} c_{Hk}(2i+m, 2j+n)/4\right)\right|$$

for k=1,2
where l refers to the l th block of bits received
and said weighted measure rule being:

$$b(l) = \begin{cases} b_1(l) & \text{if } w_1(l) \leq w_2(l) \\ b_2(l) & \text{if } w_1(l) > w_2(l) \end{cases}$$

for $l = 1, 2, \ldots, L$ where

-continued $$w_k(l) = h_L^k(l) + h_K^k(l)$$

$$h_L^k(i, j) = \sum_{(i,j) \in \text{low res} \atop \text{subband}} [d_k(i, j) + (c_{Lk}(i, j) - \mu_{Lk})^2]$$

$$h_H^k(l) = \sum_{(i,j) \text{ detail} \atop \text{subband}} t_k(i, j) + c_{Hk}(i, j)$$

$$\mu_{Lk} = \frac{\sum_{(i,j) \in \text{low res.} \atop \text{subband}} c_{Lk}(i, j)}{\text{no. of coefficients in low res. subband}}$$

$$d_k(i, j) = |c_{Lk}(i, j) - c_{Lk}(i, j+1)|$$

$$t_k(i, j) = \left| c_{Hk}(i, j) - \left( \sum_{m=0}^{1} \sum_{n=0}^{1} c_{Hk}(2i+m, 2j+n)/4 \right) \right|$$

for k=1,2
where l refers to the l th block of bits received.

5. Apparatus for providing wireless image transmission, comprising:
means for inputting an image selected from the group consisting of uncompressed images and compressed images, whereupon if said image is UNCOMPRESSED, then said apparatus for providing wireless image transmission further comprises:
  means for wavelet transforming said image to produce wavelet coefficients;
  means for scalar quantizing said wavelet coefficients;
  means for organizing said coefficients into low-resolution sub-bands and high-resolution sub-bands;
  means for representing said organized coefficients in a binary stream;
  means for modulating said binary stream representation;
  means for transmitting said modulated binary stream representation over a wireless channel;
  means for demodulating said transmitted binary stream;
  means for reconverting said demodulated binary stream back into reconverted wavelet coefficient values;
  means for dividing said reconverted wavelet coefficient values into low resolution and high resolution coefficients;
  means for combining said wavelet coefficients, said means for combining further comprising:
    a first means for determining whether said divided wavelet coefficient values in position (i,j) are different, whereas, if said divided wavelet coefficient values in position (i,j) are different, THEN said means for combining said wavelet coefficients further comprises:
      a second means for determining whether said divided wavelet coefficient values are from the low-resolution sub-band, whereas, if said divided wavelet coefficient values are from the low-resolution sub-band, THEN said second means for determining further comprises:
        means for making a set by collecting M by N said divided wavelet coefficient values that surround coefficient (i,j) from each channel;
        means for choosing the median of said set as the new coefficient value;
        means for placing said new coefficient value in a combined transform;
        means for reconstructing said image by computing the inverse wavelet transform;
        receiving said image;
      OTHERWISE, if said divided wavelet coefficient values are NOT from the low-resolution sub-band, THEN said second means for determining further comprises:
        means for choosing said divided wavelet coefficient value with a minimum absolute value;
        means for placing said coefficient value with a minimum absolute value in a combined transform;
        means for reconstructing said image by computing the inverse wavelet transform;
        receiving said image;
    OTHERWISE, if said divided wavelet coefficient values in position (i,j) are NOT different, THEN said means for combining wavelet coefficients further comprises:
      means for choosing said divided wavelet coefficient value from either channel;
      means for placing said coefficient value from either channel in a combined transform;
      means for reconstructing said image by computing the inverse wavelet transform; and
      means for receiving said image.

6. Apparatus as in claim 5, wherein said means for combining wavelet coefficients further comprises means for applying a fusion rule, said fusion rule being:

Combining rule for low-resolution subband $$c_{Lc}(i, j) = \begin{cases} c_{L1}(i, j) & \text{if } c_{L1}(i, j) = c_{L2}(i, j) \\ \text{med}[\{c_{L1}(k, l)\}, \{c_{L2}(k, l)\}] & \text{if } c_{L1}(i, j) \neq c_{L2}(i, j) \end{cases}$$

$$(k, l) \in \left( \left\{ i - \frac{m-1}{2}, \ldots, i + \frac{m-1}{2} \right\}, \left\{ j - \frac{n-1}{2}, \ldots, j + \frac{n-1}{2} \right\} \right)$$

Combining rule for high-resolution subband $$c_{Hc}(i, j) = \begin{cases} c_{H1}(i, j) & \text{if } c_{H1}(i, j) = c_{H2}(i, j) \\ c_{H1}(i, j) & \text{if } |c_{H1}(i, j)| < |c_{H2}(i, j)| \\ c_{H2}(i, j) & \text{if } |c_{H2}(i, j)| < |c_{H1}(i, j)| \end{cases}$$

where $c_{Lc}$ and $c_{Hc}$ represent the wavelet coefficients in the low and high-resolution subbands of the combined transform respectively, and $c_{L1}$, $c_{L2}$ and $c_{H1}$, $c_{H2}$ are the low and high-resolution coefficients respectively obtained from two diversity channels said fusion rule being applied to the wavelet transform of said image produced from each diversity channel so as to produce a combined wavelet transform of said image.

7. Apparatus as in claim 5 wherein IF said image is COMPRESSED, THEN said apparatus for providing wireless image transmission comprises:
means for compressing said image using SPIHT algorithm;
means for applying header information, sorting information and refinement information to said compressed image;
means for error control coding and interleaving said compressed image;
means for representing said coded and interleaved image in a binary stream;

means for modulating said binary stream representation;
means for transmitting said modulated binary stream representation over a wireless channel;
means for demodulating said transmitted binary stream;
means for error control decoding and deinterleaving said demodulated binary stream;
means for dividing each said compressed image bit stream into L blocks of $N_i$ bits each where i=1,2,3, ... L;
means for combining wavelet coefficients, comprising:
  a first means for determining whether said bit streams corresponding to said block are different, whereas if said bit streams corresponding to said block are different, THEN said means for combining wavelet coefficients further comprises:
  a second means for determining whether first said block in bit stream, whereas if first said block in bit stream, THEN said means for combining wavelet coefficients further comprises:
    means for constructing the wavelet transform coefficients from said first block;
    means for calculating a weighting function w(l) from said wavelet transform coefficients for each said image;
    means for choosing said block that results in lower said weighting function w(l);
    means for updating the composite wavelet transform coefficients using said bits of the current said chosen block;
      a third means for determining whether there are more blocks, whereas if there are more said blocks, THEN said means for combining wavelet coefficients further comprises:
      means for repeating wavelet coefficient combining;
      OTHERWISE, said means for combining wavelet coefficients further comprises:
      means for performing an inverse wavelet transform;
      means for constructing final image;
    OTHERWISE, if not first said block in bit stream; THEN said means for combining wavelet coefficients further comprises:
    means for constructing wavelet transform coefficients for each diversity channel;
    means for resuming said wavelet coefficient combining at said step of calculating the weighting function w(l) from said wavelet transform coefficients for each said image;
  OTHERWISE, if said bit streams corresponding to said block are NOT different, THEN said means for combining wavelet coefficients further comprises:
  means for choosing a block from either channel; and
  means for resuming said step of performing a wavelet coefficient combining process at said step of updating the composite wavelet transform coefficients using said bits of the current said chosen block.

8. Apparatus as in claim 7, wherein said means for combining wavelet coefficient further comprises:
  Means for applying two decision measure rules to said means for calculating a weighting function w(l), said two decision measure rules comprising a counting measure rule and a weighted measure rule,
  said counting measure rule being:

$$b(l) = \begin{cases} b_1(l) & \text{if } w(l) \geq 0 \\ b_2(l) & \text{if } w(l) < 0 \end{cases}$$

for $l = 1, 2, \ldots, L$ where $$w(l) = \sum_{(i,j) \in \text{low res subband}} h_L^l(i,j) + \sum_{(i,j) \text{ detail subband}} h_H^l(i,j)$$

$$h_L^l(i,j) = \begin{cases} 1 & d_1(i,j) < d_2(i,j) \\ -1 & d_1(i,j) > d_2(i,j) \\ 0 & c_{L1}(i,j) = c_{L2}(i,j) \end{cases}$$

$$h_H^l(i,j) = \begin{cases} 1 & t_1(i,j) < t_2(i,j) \\ -1 & t_1(i,j) > t_2(i,j) \\ 0 & c_{H1}(i,j) = c_{H2}(i,j) \end{cases}$$

$$d_k(i,j) = |c_{Lk}(i,j) - c_{Lk}(i,j+1)|$$

$$t_k(i,j) = \left| c_{Hk}(i,j) - \left( \sum_{m=0}^{1} \sum_{n=0}^{1} c_{Hk}(2i+m, 2j+n)/4 \right) \right|$$

for k=1,2
where l refers to the l th block of bits received
and said weighted measure rule being:

$$b(l) = \begin{cases} b_1(l) & \text{if } w_1(l) \leq w_2(l) \\ b_2(l) & \text{if } w_1(l) > w_2(l) \end{cases}$$

for $l = 1, 2, \ldots, L$ where $$w_k(l) = h_L^k(l) + h_H^k(l)$$

$$h_L^k(i,j) = \sum_{(i,j) \in \text{low res subband}} [d_k(i,j) + (c_{Lk}(i,j) - \mu_{Lk})^2]$$

$$h_H^k(l) = \sum_{(i,j) \text{ detail subband}} t_k(i,j) + c_{Hk}(i,j)$$

$$\mu_{Lk} = \frac{\sum_{(i,j) \in \text{low res. subband}} c_{Lk}(i,j)}{\text{no. of coefficients in low res. subband}}$$

$$d_k(i,j) = |c_{Lk}(i,j) - c_{Lk}(i,j+1)|$$

$$t_k(i,j) = \left| c_{Hk}(i,j) - \left( \sum_{m=0}^{1} \sum_{n=0}^{1} c_{Hk}(2i+m, 2j+n)/4 \right) \right|$$

for k=1,2
where l refers to the l th block of bits received.

* * * * *